March 3, 1953     C. I. NIELSEN     2,630,257
CAR TOP CARRIERS
Filed May 24, 1950
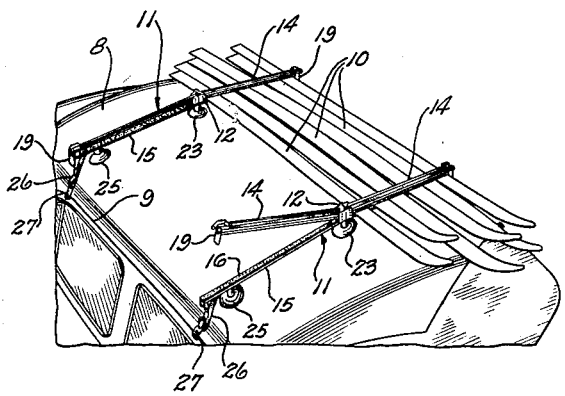
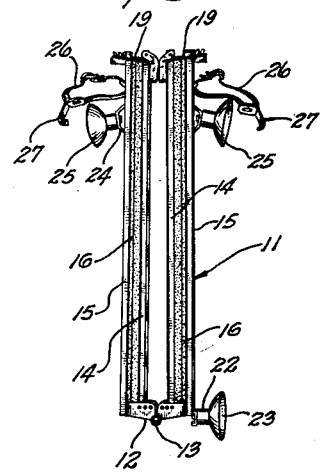
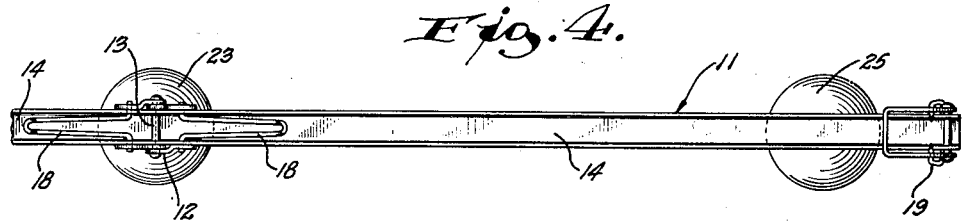
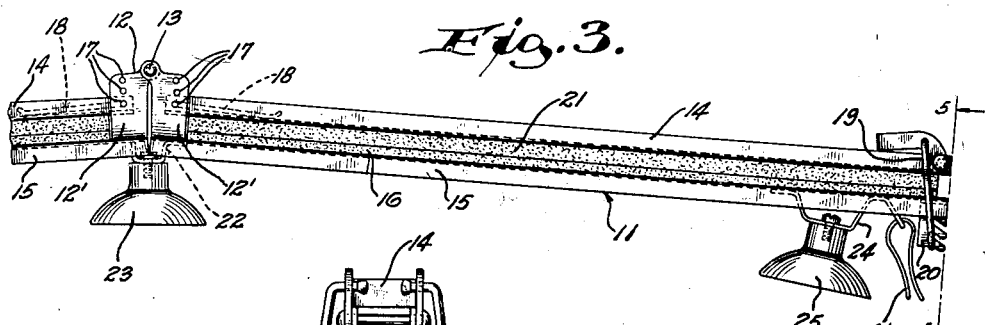
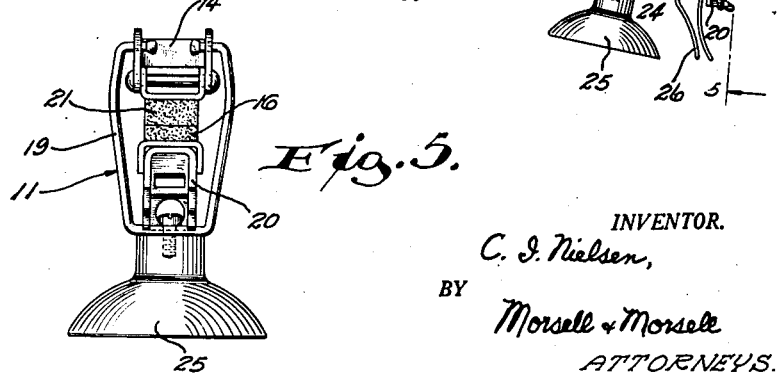
INVENTOR.
C. I. Nielsen,
BY Morsell & Morsell
ATTORNEYS.

Patented Mar. 3, 1953

2,630,257

UNITED STATES PATENT OFFICE 2,630,257

CAR TOP CARRIERS

Chester I. Nielsen, West Bend, Wis., assignor to Wesbar Stamping Corporation, West Bend, Wis., a corporation of Wisconsin Application May 24, 1950, Serial No. 163,861

4 Claims. (Cl. 224—42.1)

This invention relates to improvements in car top carriers, and more particularly to a carrier adapted to be detachably mounted on the top of an automobile for the purpose of firmly engaging and carrying elongated sports equipment such as skis, toboggans, fishing poles and the like.

A general object of the present invention is to provide a car top carrier for such elongated sports equipment as skis, fishing poles and the like, which will firmly hold a plurality of such items in a position longitudinal of the car top and in a straight condition so as to eliminate any possibility of the elongated articles becoming "set" or bent while being supported and carried.

A further object of the invention is to provide a carrier of the character described which may be readily attached to or removed from an automobile top, and which, when removed, may be compactly collapsed for convenient storage in the luggage compartment of an automobile.

A further object of the invention is to provide a car top carrier including sets of clamping bars faced with soft sponge rubber facings to prevent the marring of articles engaged therebetween.

A further object of the invention is to provide a car top carrier wherein the entire lengths of the companion clamping bars are available for use with the clamping bars being mounted to provide uniform gaps therebetween and to exert uniform clamping pressures on the equipment being carried.

A further object of the invention is to provide a car top carrier comprising a hinge bracket adapted to be secured along the longitudinal center line of the car top with pairs of article clamping bars extending transversely in each direction therefrom and carried by the companion portions of the hinge bracket whereby the bars on each side of the bracket may conform to the slope of the car top outwardly of the center line thereof.

A further object of the invention is to provide a car top carrier of the character described which is of very simple construction, which is adjustable, which is easy to manipulate, and which is well adapted for the purposes described.

With the above and other objects in view, the invention consists of the improved car top carrier and its parts and combinations as set forth in the claims, and all equivalents thereof.

In the accompanying drawing in which the same reference characters indicate the same parts in all of the views:

Fig. 1 is a fragmentary top perspective view of an automobile top equipped with the improved carrier with portions of the latter clampingly engaging sets of skis;

Fig. 2 is a detail view showing a unit of the car top carrier in its folded or collapsed condition for storage;

Fig. 3 is a fragmentary rear elevational view of one unit of the car top carrier in its adjusted operative condition, and on a larger scale;

Fig. 4 is a plan view of the showing in Fig. 3; and

Fig. 5 is an enlarged end view taken on line 5—5 of Fig. 3.

Referring now more particularly to Fig. 1, of the drawing, the numeral 8 indicates the top of a conventional automobile having at the top of each side of the automobile conventional gutters 9. In Fig. 1 there is illustrated a pair of car top carrier units with one unit of each pair spaced from the other and both spanning the top 8 of the automobile transversely. The pair of carrier units are shown as clampingly engaging, on one side of the longitudinal center line of the car top, sets of skis 10. It is obvious that on the other side of the center line of the car top the clamping bars of the units may also be arranged to engage sets of skis or other elongated sports equipment. For purposes of illustration the clamping bars on the rear unit in Fig. 1, to the left of the longitudinal center line of the car top are open.

The companion car top carrier units designated generally by the numerals 11 are of identical construction and hence the following detailed description of the rear unit 11 will serve for both. Said unit includes a hinge bracket 12 which in the installed position has its hinge pintle 13 joining the two companion bracket members 12' uppermost, said bracket members 12' being of channel formation with each bracket member 12' engaging the inner ends of a pair of superimposed elongated clamping bars 14 and 15. The lowermost clamping bar 15 has its inner end permanently secured to the undersurface of the adjacent bracket member 12'. The top surface of said bar 15, in the operative position of the latter, carries a pad or facing 16 of sponge rubber or a similar suitable resilient cushioning material. The inner end of the top clamping bar 14 of a companion pair is adjustably received within the channel of the adjacent bracket member 12'. It will be observed that the latter is provided with a series of apertures 17 at different elevations and the inner end of the top bar 13 has in its side flanges apertures to register with the selected apertures 17 in the bracket member 12'. The correct spacing arrangement as between the clamping bars 14 and 15 is determined, and to secure the inner end portion of the top bar 14 to the bracket member 12' in a desired position of adjustment a spring clip 18 is utilized with the flanged extremities of the same being passed through the apertures in the end of the bar 14 and through the selected apertures 17 and the bracket member 12'. To maintain the proper spacing relation between the companion clamping bars 14 and 15 throughout their lengths, for even engagement with all of the devices such as skis clamped therebetween, the outer end of the top bar is provided with a pivotally mounted toggle link 19 adapted for selective engagement with any of three notches in a hooking bracket 20 secured to and depending from the outer end of the clamping bar 15. The undersurface of the top bar 14, in its operative position, has secured thereto a facing 21 of sponge rubber or other suitable resilient material.

A pair of companion clamping bars 14 and 15 adjustably associated with one bracket member 12' of the complete hinge bracket 12 have been described. From the drawing it will be obvious that the other bracket member 12' has associated therewith a similar pair of companion clamping bars 14 and 15 extending from the member 12 in a direction opposite from the direction of extent of the clamping bars 14 and 15 first described. The inner end portion of one of the bottom bars 15 of the assemblage rigidly carries one leg of a depending angular U-bracket 22 whose other leg, when the assemblage is in the position of Fig. 3, nests within the inner end portion of the adjacent bottom bar 15 to support the latter in proper relationship with respect to the other bar 15. Said depending bracket 22 carries a conventional suction cup 23 which, when the assemblage is applied to the top 8 of an automobile, is adapted to be secured along the longitudinal center line of the top with the pairs of companion arms 14 and 15 extending in opposite directions from the secured suction cup 23 and hinge 12 thereabove, as shown in Fig. 1. The outer end portion of each bottom clamping bar 15 of an assemblage also carries a bracket 24 to which is secured a suction cup 25 in a manner so that the plane of the bottom thereof is inclined to horizontal slightly in the applied position of the assemblage, and thus evenly and securely seats on and is adapted for securement to the outer inclined extent of the automobile top. The brackets 24 also have attached thereto portions of adjustable straps 26. The outer ends of the latter carry hooking plates 27 which, when engaged with the automobile gutters 9, provide additional anchorages for the units 11.

In Fig. 1 there is illustrated the manner in which the car top carrier is applied to the top of an automobile, and it will be observed that the two identical units are spaced apart so as to provide a front and a rear transverse clamping unit. The suction cups 23 carried by the hinge units 12 are secured along the longitudinal center line of the car top 8 so that the respective pairs of arms, extending in opposite directions from the cups, traverse the car top from the longitudinal center line outwardly. The lower bars 15 have their outer ends anchored to the car top by the suction cups 25. Each hinge member 12, because of its peculiar construction, allows both pairs of clamping arms extending therefrom to incline slightly outwardly, to conform to the pitch of the automobile roof. The normal disposition is shown in Fig. 3 and it will be observed that the side faces of the complementary hinge portions 12' are slightly tapered toward their lower edges with the result that one pair of clamping bars forms an obtuse angle with respect to the adjacent pair of clamping bars.

Before articles to be clamped and carried are mounted on the car top carrier, the upper clamping bars 14 are released in the manner shown at the left of the rear unit in Fig. 1. Elongated sports equipment such as skis 10 or other long objects are then mounted on the lower bars of each unit 11 and the upper bars are then swung down into clamping engagement with the articles and the outer ends of the bars are so secured by the toggle clamps 19 engaged with their respective hooking brackets 20. The spacing arrangement between the upper and lower bars of each pair may be regulated to conform with the thickness of the articles clamped. As was previously mentioned, this is accomplished by the selective mounting of the extremities of a spring clip 18 in a selected set of apertures 17 in the adjacent hinge member 12' and the corresponding engagement of the toggle clamp 19 for that set of bars in the proper notch of its bracket 20. Through this adjustment parallelism throughout the entire length of the pair of clamping bars 14 and 15 is maintained with consequent even clamping pressure on the skis or articles engaged thereby, irrespective of the thickness of the latter.

Figs. 1, 3 and 4 of the drawing illustrate the disposition of a car top carrier unit in its operative position. It is obvious that the carrier units, when not in use, may be easily removed from the car top. This is accomplished by disengaging the hooking plates 27 from the car gutters, detaching the suction cups 23 and 25, and then folding the pairs of companion bars of a unit upwardly and against one another until the position of Fig. 2 is attained. In this condition a unit 12 is compacted and is susceptible of convenient storage in a small space as in the luggage compartment of an automobile. The facings of the companion clamping bars 14 and 15 with sponge rubber or the like is advantageous in that such facings are resilient and will not scratch nor mar the articles clamped between the bars.

From the foregoing description it will be evident that the improved car top carrier is of very simple construction, is strong and durable, is easy to operate and to collapse, conforms to the shape of the car top to which it is applied, exerts uniform clamping pressures on the articles engaged, and is well adapted for the purposes described.

What is claimed as the invention is:

1. An equipment carrier adapted to be detachably mounted on the top of an automobile, comprising two pairs of companion article clamping bars, a two-section hinge bracket interposed between the inner ends of said pairs of bars to which said ends are connected in a manner to permit spreading of the bars each pair, said hinge bracket including a horizontal pintle connecting the two sections and from which the latter depend and said sections being downwardly tapered whereby the axes of said sections may be disposed at an angle to vertical, and clamping means for detachably connecting the outer end portions of the bars of each pair.

2. A carrier for use in transporting thin elongated equipment on the top of an automobile of the type wherein opposite sides of said top slope downwardly outwardly from the longitudinal center line, comprising front and rear transverse clamping units extending across the car top and adapted to have clamping engagement with the equipment carried, each clamping unit including two pairs of superimposed adjustable rectilineal bars with one pair of bars normally being disposed endwise to its companion pair of bars, a two-part hinge member wherein the two parts thereof are connected by a horizontal pintle positioned above the longitudinal center line of the car top with each part of the hinge member depending therefrom and assuming an inclination corresponding to the car top portion therebelow, said hinge member joining the inner ends of one pair of bars to the inner ends of the other pairs of bars, and means associating each pair of bars to the hinge member at one end and to each other at the other end to maintain the bars of each pair in spaced parallelism throughout their lengths.

3. A carrier for use in transporting thin elongated equipment on the top of an automobile, comprising front and rear transverse clamping units extending across the car top and adapted to have clamping engagement with the equipment carried, each clamping unit including two pairs of superimposed adjustable rigid bars with one pair of bars normally being disposed endwise to its companion pair of bars, a two-part hinge member interposed between the inner ends of said pairs of bars coincident with the longitudinal center line of the automobile top, the two parts of the hinge member being pivotally joined by a top horizontal pintle and depending therefrom on opposite sides of the longitudinal center line of the automobile top, the inner end of the lower bar of each pair being rigidly affixed to an adjacent part of said hinge member and the inner end of the upper bar of each pair being hingedly and vertically adjustably carried by an adjacent part of said hinge member, the arrangement of said hinge member relative to the pairs of bars being such that one pair of bars may form an obtuse angle with the other pair of bars or be folded thereon, and means at the outer end of each pair of bars for adjustably clamping the same together in conformity with the relative adjustments of the inner ends of said bars.

4. A carrier for use in transporting thin elongated equipment on the top of an automobile of the type wherein opposite sides of said top slope downwardly outwardly from the longitudinal center line, comprising front and rear transverse clamping units extending across the car top and adapted to have clamping engagement with the equipment carried, each clamping unit including two pairs of superimposed adjustable bars with one pair of bars normally being disposed endwise of its companion pair of bars, a two-part hinge member wherein the two parts thereof are connected by a horizontal pintle positioned above the longitudinal center line of the car top with each part of the hinge member depending from the pintle and assuming an inclination corresponding to the car top portion therebelow, said hinge member joining the inner ends of one pair of bars to the inner ends of the other pairs of bars, means associating each pair of bars to the hinge member at their inner ends and to each other at their outer ends to maintain the bars of each pair in predetermined, adjusted, spaced parallelism throughout their lengths, and means for removably anchoring said clamping units to the top of an automobile.

CHESTER I. NIELSEN.

REFERENCES CITED

The following references are of record in the file of this patent:

UNITED STATES PATENTS

| Number | Name | Date |
|---|---|---|
| 2,171,053 | White | Aug. 29, 1939 |
| 2,268,958 | Parten et al. | Jan. 6, 1942 |
| 2,440,821 | Godwin | May 4, 1948 |
| 2,575,458 | Merrill | Nov. 20, 1951 |

FOREIGN PATENTS

| Number | Country | Date |
|---|---|---|
| 317,704 | Italy | May 19, 1934 |
| 814,207 | France | Mar. 15, 1937 |
| 49,274 | France | Nov. 12, 1938 |